Sept. 12, 1933.   O. L. VAN STEENIS   1,926,128
ELECTRODE SUPPORT
Filed Aug. 8, 1930

INVENTOR
O.L. VAN STEENIS
BY
ATTORNEY

Patented Sept. 12, 1933

1,926,128

UNITED STATES PATENT OFFICE 1,926,128

ELECTRODE SUPPORT

Otto Louis van Steenis, Eindhoven, Netherlands, assignor to Radio Corporation of America, a corporation of Delaware Application August 8, 1930, Serial No. 473,814, and in the Netherlands September 19, 1929

3 Claims. (Cl. 250—27.5)

This invention has reference to discharge tubes in which one or more springs are used for supporting the electrodes.

A commonly known method of securing these springs to a metal carrying member consists in welding their ends thereto. Another method of attachment consists in fusing the ends of the springs into a carrying member of glass or similar material. These methods have the disadvantage that as a result of the heating operation necessary for establishing the junction, the springs are locally let down at the point of attachment and thereby lose their resilience.

According to the invention this disadvantage is obviated by bending the spring or springs from where they are secured to their carrying member, through some distance along the circumference thereof.

Thus, when the spring is let down at the point of welding or fusing this does not exercise any noticeable influence on the elastic capacity, as the spring in loaded condition will engage more or less the circumference of the carrying member from the point of attachment. Apart from this there arises the additional advantage that the resiliency is improved by the particular shape of the spring.

Preferably, the carrying member for the springs has a round cross-section and advantageously it may consist of glass or similar material into which the end of the spring is fused. In order that the invention may be clearly understood and carried into effect, one embodiment thereof will be described more fully with reference to the accompanying drawing, in which.

Figure 1:
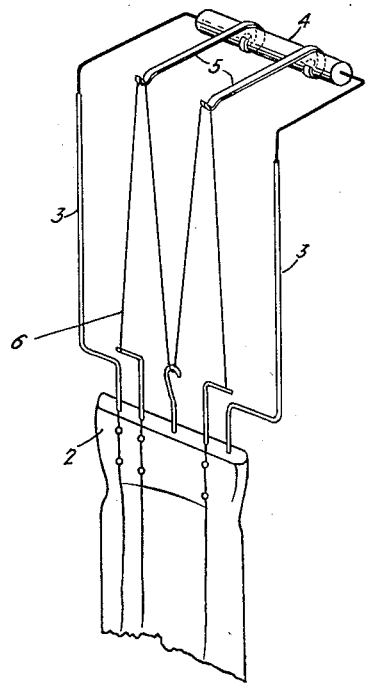
Figure 1 shows the invention as applied in the support of a filament.

Referring to Figure 1, the pinch 2 has mounted on it two supporting wires 3 which may carry an anode (not shown). Other wires may carry a grid. Upon the ends of the supporting wires 3 a glass rod 4 is carried in which the ends of two springs 5 are fused. From the point of fusing said springs are bent around the glass rod, in the example shown through a distance of about 270°. The filament 6 is suspended from the ends of the springs 5.

Figure 2:
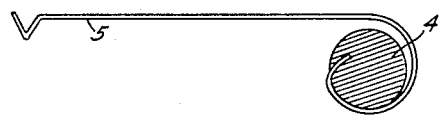
Figure 2 is a corresponding cross-sectional view of the carrying member to which a spring is attached.

Figure 2 shows that from its point of fusing until where it leaves the carrying member 4 the spring 5 recedes more and more from the circumference of the carrying member. In loaded condition, the greater the load the greater is the distance from the point of fusing through which the spring will engage the circumference of the carrying member 4. Thus, it is immaterial in connection with the resiliency whether the spring has lost its elastic capacity at the point of fusing.

The spring may describe from the point of fusing a smaller or greater arc along the circumference of the carrying member and may even be wound around it one or more times before passing to the electrode to be supported.

Obviously, as an alternative, the carrying member 4 may be of metal, which permits of the spring being joined thereto, for example, by welding.

Although the cross-section of the carrying rod 4 shown in the drawing is round, it may be different, for example elliptical.

If desirable or necessary, the anode and grid (or grids if there be more than one), or any of them, may be similarly supported by springs.

I claim:

1. In an electron discharge tube, means for resiliently supporting an electrode, comprising an oblong glass support, and a spring member having a straight portion extending transversely of said support and a coiled end-portion substantially surrounding said support with the extremity of said coiled portion anchored to said support.

2. In an electron discharge tube, means for resiliently supporting an electrode, comprising an oblong glass support, and a spring member having a straight portion projecting from and transversely of said support with one end engaging with the electrode and the other end portion loosely curved around and substantially surrounding said support with its end anchored to said support.

3. Means for resiliently supporting the cathode in an electron discharge tube, comprising a rigid support, a spring member anchored to and extending substantially perpendicularly from said support, that portion of the spring member adjacent to the point of anchorage being coiled about the support in a manner such that for a substantial distance the coiled portion abuts against the surface of the support, the remaining coiled portion forming with the surface of the support a clearance space, and means at the other end of the spring member for engaging with the cathode.

OTTO LOUIS van STEENIS.